US012771884B2

(12) United States Patent
Liu et al.

(10) Patent No.: US 12,771,884 B2
(45) Date of Patent: Oct. 20, 2026

(54) METHOD, APPARATUS, DEVICE AND STORAGE MEDIUM FOR LIVE STREAM PLAYBACK GENERATION

(71) Applicant: Beijing Zitiao Network Technology Co., Ltd., Beijing (CN)

(72) Inventors: Dongjie Liu, Beijing (CN); Xin Guan, Beijing (CN); Shuang Wu, Beijing (CN); Guanghui Ren, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/997,577

(22) PCT Filed: Dec. 13, 2023

(86) PCT No.: PCT/CN2023/138593

§ 371 (c)(1),
(2) Date: Jan. 22, 2025

(87) PCT Pub. No.: WO2024/140231

PCT Pub. Date: Jul. 4, 2024

(65) Prior Publication Data

US 2026/0032293 A1 Jan. 29, 2026

(30) Foreign Application Priority Data

Dec. 30, 2022 (CN) ........................ 202211739061.0

(51) Int. Cl.
*H04N 21/21* (2011.01)
*H04N 21/2187* (2011.01)
*H04N 21/2343* (2011.01)

(52) U.S. Cl.
CPC . *H04N 21/2187* (2013.01); *H04N 21/234363* (2013.01)

(58) Field of Classification Search
None
See application file for complete search history.

(56) References Cited

U.S. PATENT DOCUMENTS

2010/0205049 A1* 8/2010 Long .................. G06Q 30/0252 705/14.5
2020/0241835 A1 7/2020 Geng et al.

FOREIGN PATENT DOCUMENTS

CN 106412677 A 2/2017
CN 111182358 A 5/2020
(Continued)

OTHER PUBLICATIONS

ISA China National Intellectual Property Administration, International Search Report Issued in Application No. PCT/CN2023/138593, Feb. 22, 2024, 6 pages.
(Continued)

*Primary Examiner* — Samira Monshi
(74) *Attorney, Agent, or Firm* — Alleman Hall LLP

(57) ABSTRACT

According to embodiments of the disclosure, a method, apparatus, device, and computer-readable storage medium for live stream playback generation are provided. The method includes: initiating, at a first instant during a live stream, generation of first playback data associated with a live stream content from a live stream starting instant to the first instant; in response to a completion of the generation of the first playback data, providing an access entry for the first playback data; initiating, at a second instant during the live stream, generation of second playback data associated with a live stream content from the live stream starting instant to the second instant; and in response to a completion of the generation of the second playback data, associating the second playback data to the access entry to replace the first playback data.

18 Claims, 5 Drawing Sheets

(56) References Cited

FOREIGN PATENT DOCUMENTS

| | | | |
|---|---|---|---|
| CN | 111447455 | A | 7/2020 |
| CN | 112399258 | A | 2/2021 |
| CN | 110113626 | B | 5/2021 |
| CN | 113014969 | A | 6/2021 |
| CN | 114666616 | A | 6/2022 |
| JP | 2017028388 | A | 2/2017 |
| KR | 20200002771 | A | 1/2020 |

OTHER PUBLICATIONS

Japan Patent Office, Office Action Issued in Application No. 2024575476, Dec. 2, 2025, 6 pages.

* cited by examiner

METHOD, APPARATUS, DEVICE AND STORAGE MEDIUM FOR LIVE STREAM PLAYBACK GENERATION

CROSS-REFERENCE TO RELATED APPLICATIONS

This application claims the benefit of Chinese Patent Application No. 202211739061.0, filed on Dec. 30, 2022, entitled 'METHOD, APPARATUS, DEVICE AND STORAGE MEDIUM FOR LIVE STREAM PLAYBACK GENERATION', and the entire content of which is incorporated herein by reference.

FIELD

Example embodiments of the present disclosure generally relate to the field of computers, and in particular, to a method, apparatus, device, and computer-readable storage medium for live stream playback generation.

BACKGROUND

With the development of computer technologies, various live stream may provide people with content such as information, education and entertainment. In a live stream room, it is possible to play a variety of events in progress in real time. If a user misses a live stream in time or wants to recap a highlight from a live stream, the user always looks at the live stream playback video to obtain the content of interest.

SUMMARY

In a first aspect of the present disclosure, a method for live stream playback generation is provided. The method includes: initiating, at a first instant during a live stream, generation of first playback data associated with a live stream content from a live stream starting instant to the first instant; in response to a completion of the generation of the first playback data, providing an access entry for the first playback data; initiating, at a second instant during the live stream, generation of second playback data associated with a live stream content from the live stream starting instant to the second instant; and in response to a completion of the generation of the second playback data, associating the second playback data to the access entry to replace the first playback data.

In a second aspect of the present disclosure, an apparatus for live stream playback generation is provided. The apparatus includes: a first playback data generation initiating module configured to initiate, at a first instant during a live stream, generation of first playback data associated with a live stream content from a live stream starting instant to the first instant; an access entry providing module configured to, in response to a completion of the generation of the first playback data, provide an access entry for the first playback data; a second playback data generation initiating module configured to initiate, at a second instant during the live stream, generation of second playback data associated with a live stream content from the live stream starting instant to the second instant; and a playback data replacing module configured to, in response to a completion of the generation of the second playback data, associate the second playback data to the access entry to replace the first playback data.

In a third aspect of the present disclosure, an electronic device is provided. The apparatus includes at least one processing unit; and at least one memory coupled to the at least one processing unit and storing instructions for execution by the at least one processing unit, the instructions, when performed by the at least one processing unit, causing the electronic device to perform the method of the first aspect.

In a fourth aspect of the present disclosure, a c computer-readable storage medium having a computer program stored thereon is provided. The computer program is executable by a processor to implement the method of the first aspect.

It should be understood that the content described in the content part of the present disclosure is not intended to limit the key features or important features of the embodiments of the present disclosure, nor is it intended to limit the scope of the present disclosure. Other features of the present disclosure will become readily understood from the following description.

BRIEF DESCRIPTION OF DRAWINGS

The above and other features, advantages, and aspects of various embodiments of the present disclosure will become more apparent from the following detailed description taken in conjunction with the accompanying drawings. In the drawings, the same or similar reference numbers refer to the same or similar elements, wherein.

DETAILED DESCRIPTION

Figure 1:
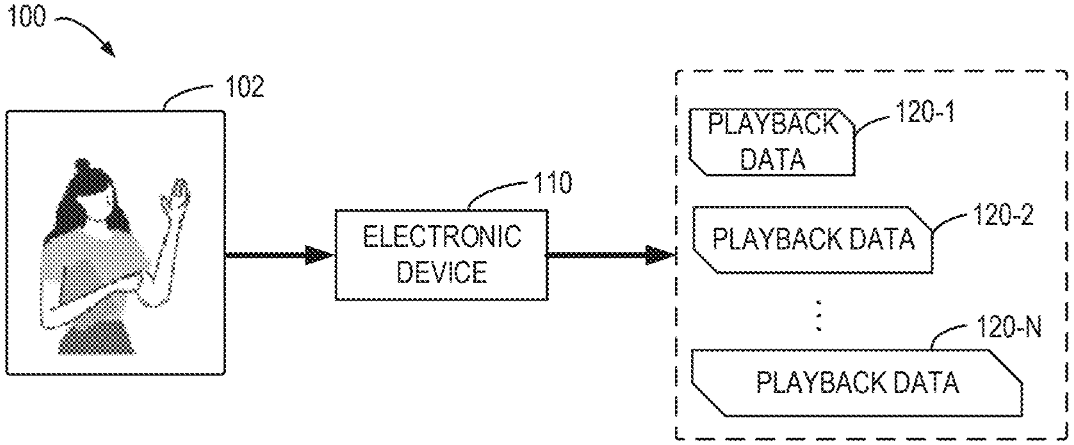
FIG. 1 illustrates a schematic diagram of an example environment in which embodiments of the present disclosure may be implemented.

It may be understood that, before the technical solutions disclosed in the embodiments of the present disclosure are used, the types of personal information related to the present disclosure, the usage scope, the usage scenario and the like should be notified to the user in an appropriate manner according to the relevant laws and regulations, and the authorization of the user is obtained.

For example, in response to receiving an active request from a user, prompt information is sent to the user to explicitly prompt the user that the requested operation will need to obtain and use personal information of the user, so that the user may autonomously select whether to provide personal information to software or hardware executing the operation of the technical solution of the present disclosure according to the prompt information.

As an optional but non-limiting implementation, in response to receiving an active request of the user, a manner of sending prompt information to the user may be, for example, a pop-up window, and prompt information may be presented in a text manner in the pop-up window. In addition, the pop-up window may further carry a selection control for the user to select 'agree' or 'disagree' to provide personal information to the electronic device.

It may be understood that the foregoing notification and obtaining a user authorization process are merely illustrative, and do not constitute a limitation on implementations of the present disclosure, and other manners of meeting related laws and regulations may also be applied to implementations of the present disclosure.

It may be understood that the data involved in the technical solution (including but not limited to the data itself, the obtaining or use of the data) should follow the requirements of the corresponding laws and regulations and related regulations.

Embodiments of the present disclosure will be described in more detail below with reference to the accompanying drawings. While certain embodiments of the present disclosure are shown in the accompanying drawings, it should be understood that the present disclosure may be implemented in various forms and should not be construed as limited to the embodiments set forth herein. Rather, these embodiments are provided for a more thorough and complete understanding of the present disclosure. It should be understood that the drawings and embodiments of the present disclosure are for example purposes only and are not intended to limit the scope of the present disclosure.

It should be noted that the title of any section/subsection provided herein is not limiting. Various embodiments are described throughout, and any type of embodiments may be included in any section/subsection. Furthermore, the embodiments described in any section/subsection may be combined in any manner with the same section/subsection and/or any other embodiment described in different sections/subsections.

In the description of the embodiments of the present disclosure, the terms 'including', and the like should be understood to include 'including but not limited to'. The term 'based on' should be understood as 'based at least in part on'. The terms 'one embodiment' or 'the embodiment' should be understood as 'at least one embodiment'. The term 'some embodiments' should be understood as 'at least some embodiments'. Other explicit and implicit definitions may also be included below. The terms 'first,' 'second,' and the like may refer to different or identical objects. Other explicit and implicit definitions may also be included below.

As used herein, the term 'model' may learn associations between respective inputs and outputs from training data such that corresponding outputs may be generated for a given input after training is complete. The generation of the model may be based on machine learning techniques. Deep learning is a machine learning algorithm that processes inputs and provides corresponding outputs by using a multi-layer processing unit. 'Model' may also be referred to herein as a 'machine learning model,' 'machine learning network,' or 'network,' and these terms are used interchangeably herein. A model may in turn include different types of processing units or networks.

As used herein, a 'unit,' an 'operating unit,' or a 'subunit' may be composed of a machine learning model or network of any suitable structure. As used herein, a set of elements or similar expressions may include one or more such elements. For example, a 'set of convolution units' may include one or more convolution units.

As briefly mentioned above, the user often obtains a content of interest by viewing the live stream playback video. In a traditional scheme of generation of live stream playback, the live video is with a time-shifted stream at the end of the live stream. After the entire live stream is successfully transcoded, the playback video is provided to the user for viewing. Such traditional scheme of generation of live stream playback is time consuming and has poor timeliness, which cannot satisfy the needs of users who want to view the playback as soon as possible.

Some schemes that directly distribute playback video using time-shifted streams based on the start-end time have been proposed. However, such solution requires time-shifted streams in Hypertext Transfer Protocol (HTTP)-based Adaptive Bitrate Streaming Transport Protocol (HLS) format, which requires a high level of player adaptation. In addition, due to HLS encoding, the playback video of this scheme is slow to load, which is unable to open quickly on the user side, and the buffering time to enter the playback is long. Therefore, this scheme also fails to satisfy the needs of users who want to view the playback as soon as possible.

Currently, some schemes have been proposed for live streaming while transcoding of live stream playback generation. This scheme simultaneously uses the played content for segment transcoding during a live stream and racks on-demand the playback at the end of the live stream. However, this kind of segmented transcoding still has a transcoding duration, which is determined based on a slice length, and cannot be played immediately after the live stream is ended.

The embodiment of the disclosure provides a scheme for live stream playback generation. According to various embodiments of the present disclosure, generation of first playback data associated with a live stream content from a live stream starting instant to a target instant is initiated at the target instant (for example, a first instant) during a live stream. When the generation of the first playback data is completed and an access entry is not provided, an access entry for the playback data is provided. When an access entry for the playback data is provided, the playback data is associated to the access entry to replace the prior playback data. When there is a next target instant after the target instant, a generation of playback data and replacement of subsequent playback data may be initiated at the next target instant. Thus, different lengths of playback data may be generated at different instances. These playback data may then be associated to the access entry for the user to view, enabling the user to view a live stream playback that is quickly online.

Example embodiments of the present disclosure are described below with reference to the accompanying drawings.

Example Environment

FIG. 1 illustrates a schematic diagram of an example environment 100 in which embodiments of the present disclosure may be implemented. In this example environment 100, the electronic device 110 receives live stream data 102. The live stream data 102 may be real-time video live stream data in any format. As the live stream continues, the live stream data 102 is continuously updated accordingly.

The electronic device 110 generates a plurality of playback data, such as playback data 120-1, playback data 120-2, . . . , playback data 120-N (N may be any natural number greater than 1) based on the received live stream data 102. For ease of description, the playback data 120-1, the playback data 120-2, . . . , the playback data 120-N may be collectively referred to herein as 'the playback data 120', herein.

As shown in FIG. 1, different playback data 120 generated by the electronic device 110 may have different durations.

These playback data 120 may correspond to live stream content from a live stream starting instant to a certain instant during the live stream. The electronic device 110 may provide the user with an access entry for the playback data 120. The user may view the playback data 120 of the live stream data 102 through the access entry. The process of generation of the playback data 120 will be described below in connection with FIG. 2.

In some embodiments, the electronic device 110 may be any type of mobile terminal, fixed terminal, or portable terminal, including a mobile phone, a desktop computer, a laptop computer, a notebook computer, a netbook computer, a tablet computer, a media computer, a multimedia tablet, a personal communication system (PCS) device, a personal navigation device, a personal digital assistant (PDA), an audio/video player, a digital camera/camcorder, a positioning device, a television receiver, a radio broadcast receiver, an electronic book device, a gaming device, or any combination of the foregoing, including accessories and peripherals of these devices, or any combination thereof. In some embodiments, the terminal device 110 may also support any type of interface for a user (such as a 'wearable' circuit, etc.).

In some embodiments, the electronic device 110 may also be a server. For example, the electronic device 110 may be various types of computing systems/servers capable of providing computing power, including but not limited to, mainframes, edge computing nodes, computing devices in a cloud environment, and the like.

It should be understood that the structures and functions of the various elements in the environment 100 are described for example purposes only and do not imply any limitation to the scope of the present disclosure.

Example Process of Playback Data Generation

Figure 2:
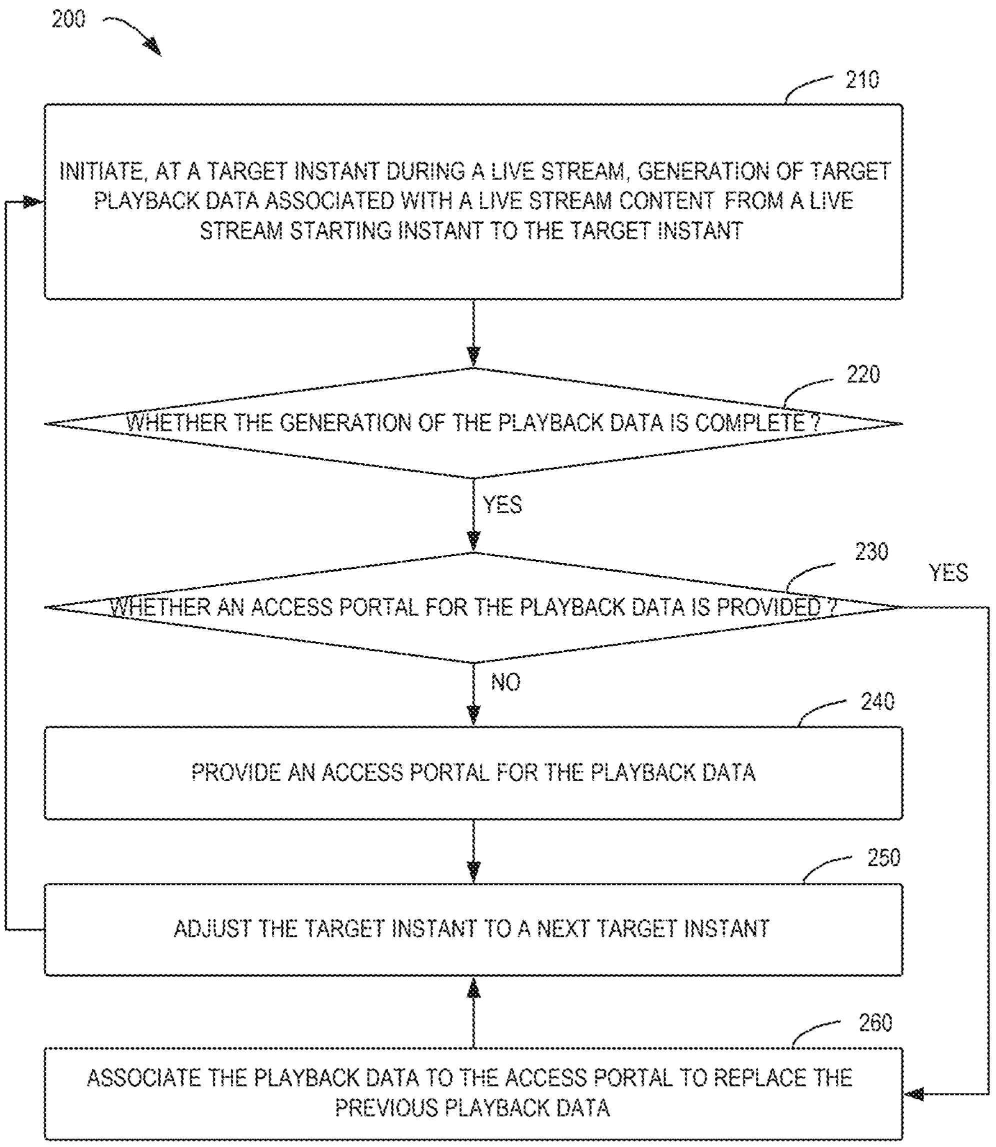
FIG. 2 illustrates a flowchart of a process for live stream playback generation according to some embodiments of the present disclosure.

FIG. 2 illustrates a flowchart of a process 200 for playback data for generating a live stream according to some embodiments of the present disclosure. The process 200 may be implemented at the electronic device 110. The process 200 is described below with reference to FIG. 1.

At block 210, the electronic device 110 initiates, at a target instant during a live stream, generation of target playback data associated with a live stream content from a live stream starting instant to the target instant. In some embodiments, the target instant may be one or more predetermined time points. For example, the target instant may be a first instant at a predetermined duration from a starting instant of the live stream. The target instant may also be a next target instant that is separated from the previous target instant by a predetermined duration. A plurality of target instants may be set during live stream according to the predetermined duration. At these target instants, the electronic device 110 initiates generation of playback data associated with a live stream content from a live stream starting instant to a corresponding target instant. In other words, the electronic device 110 initiates a generation of corresponding playback data once every predetermined duration.

In some embodiments, the predetermined duration may be arbitrarily set by the electronic device 110 or by the user. As an example, the predetermined duration may be 1 minute, 5 minutes, 10 minutes, or other suitable duration.

In some embodiments, the playback data is generated based on transcoding at least a portion of a corresponding live stream content. The manner of transcoding may be arbitrary, such as HLS, Moving Picture Experts Group (MP4) or other appropriate format transcoding.

Additionally or in addition, in some embodiments, the playback data is generated based on transmuxing at least a part of respective live stream content. As an example, a dynamic adaptive stream based on HTTP (dash) may be used for forwarding encapsulation. As an example, HTTP-based dynamic adaptive streaming (dash) may be configured for transmuxing. For example, the electronic device 110 may transmuxe a live stream content in, for example, HLS format from a live stream starting instant to a corresponding target instant into playback data in dash format (also referred to as vid) at a target instant. Compared to transcoding, the use of transmuxing to generate playback data can speed up the process of generating playback data, and thus speed up the process of racking the playback data.

In this way, playback data corresponding to live streams of different durations can be generated at different instants. In this manner, transmuxing can be performed without interruption during the live stream, thereby generating playback data for each transmuxing. On the other hand, using the dash format, the starting speed is lower than that of MP4, HLS and other formats, which ensures that the starting speed on the user side is not higher than that of conventional on-demand video.

As mentioned above, in a traditional scheme of live stream playback generation, the live stream is usually transcoded using a time-shifted stream at the end of the live stream. This scheme of live stream playback generation requires the use of the entire live stream to generate a playback, and it is not possible to select the video segment for which the playback is to be generated, so it is not possible to highlight the key content. In addition, in a conventional scheme of live stream-while-transcoding live playback generation, it is likewise impossible to select the video segment for which one wants to generate the playback, and it is not possible to highlight the key contents.

Embodiments of the present disclosure support selection of part of a live stream content and support generation of playback data for the selected content. Specifically, in some embodiments, the electronic device 110 may determine time constraint information indicating at least one time segment that needs to be processed during a time segment from a live stream starting instant to a target instant. The electronic device 110 may generate playback data corresponding to the at least one time segment.

Taking the target instant as a first instant as an example, the time constraint information may indicate at least one time segment that needs to be processed during a first time segment from the live stream starting instant to the first instant. The electronic device 110 may generate the first playback data corresponding to the at least one time segment.

In some embodiments, the time constraint information may be provided by a user. For example, the user may manually set a start time and/or an end time of the at least one time segment that needs to be processed during the first time segment as the time constraint information. The electronic device 110 may generate corresponding playback data based on the manually set start time and/or end time of the time segment to be processed by the user. For example, if the user only manually sets the start time, the electronic device 110 may generate corresponding playback data based on the start time and the target instant. As a further example, if the user manually sets the start time and the end time, the electronic device 110 may generate the corresponding playback data based on the start time and the end time.

Additionally or in addition, in some embodiments, the time constraint information may be generated by the electronic device 110. For example, the start of the live stream and the end of the live stream typically have a certain duration of live stream segments that have no actual content. The electronic device 110 may generate time constraint information to remove such live stream segments without actual content.

By generating playback data based on time constraint information, unwanted live stream content can be removed. In addition, it is possible to select a live stream segment for which a playback is to be generated based on a manual setting of the user, so that the generated playback data meets the needs of the user. In this manner, video cropping can be supported during the live stream. The user may crop the live stream content at any time during the live streaming process to remove unwanted content when generating the playback data.

In some embodiments, the electronic device 110 may associate cropped playback data to the access entry. Additionally or in addition, in some embodiments, the electronic device 110 may associate both uncropped playback data as well as cropped playback data to the access entry to meet different needs for live stream playback generation.

At block 220, the electronic device 110 determines whether the generation of the playback data is complete. For example, the electronic device 110 may determine whether the generation of the playback data initiated at a target instant (e.g., a first instant or other instants) is complete.

In some embodiments, when the electronic device 110 determines, at block 220, that the generation of the playback data is complete, then at block 230, the electronic device 110 determines whether an access entry for the playback data is provided. When the electronic device 110 determines, at block 230, that the access entry for the playback data is not provided, the electronic device 110 provides an access entry for the playback data at block 240. For example, it is assumed that a first instant is the first instant at which the generation of the playback data is initiated. That is, no playback data is generated and no access entry for the playback data is provided prior to the first instant. In this case, if the electronic device 110 generates the first playback data corresponding to the first instant, the electronic device 110 provides an access entry for the first playback data at block 240.

At block 250, the electronic device 110 adjusts the target instant to a next target instant. As previously mentioned, the next target instant may be an instant that is separated from the current target instant by a predetermined duration. In some embodiments, the electronic device 110 may determine whether the live stream is stopped. If the live stream stops, the electronic device 110 may determine the next target instant as the instant at which the live stream stops. If the live stream does not stop, the electronic device 110 then adjusts the target instant to the next target instant that is separated from the current target instant by a predetermined duration.

In the event that the electronic device 110 adjusts the target instant to the next target instant at block 250, the electronic device 110 will continue to initiate the generation of the corresponding playback data at block 210. As an example, in the case where the target instant is a second instant after the first instant, at the second instant during the live stream, the electronic device 110 initiates, at block 210, a generation of the second playback data associated with the live content from the live stream starting instant to the second instant.

In some embodiments, the electronic device 110 may generate third playback data associated with a live stream content from the first instant to the second instant. The electronic device 110 may generate the second playback data based on the first playback data and the third playback data. In this way, the process of generating playback data may be simplified.

Similar to the generation of playback data described previously, the second playback data may also be generated based on transmuxing at least a part of respective live stream content. During the generation of the second playback data, the electronic device 110 may also select at least one of the second time segments to be processed from the live stream starting instant to the second instant based on time constraint information. The process of generating the second playback data is not described herein again.

If the generation of the second playback data is complete, at block 220, the electronic device 110 determines that the generation of the playback data is complete. The process 200 proceeds to block 230 where the electronic device 110 determines that an access entry for the playback data is provided. If the electronic device 110 determines that the access entry for the playback data is provided, the electronic device 110 associates the playback data (e.g., the second playback data) to the access entry at 260 to replace the previous playback data (e.g., the first playback data). In this way, the playback data may be continuously replaced in the process of the live stream.

In some embodiments, after generating the second playback data, the electronic device 110 continues to adjust the target instant to a next target at block 250. In this way, the electronic device 110 may continually repeat the playback data generation and replacement process described above until the end of the live stream. By continually replacing the previous playback data with playback data that is longer in duration, it is possible to make the playback data at the access entry preserve the live stream content for as long as possible. In this manner, it is possible to make the playback content posted to the public as free of defects as possible. On the other hand, this manner may ensure that there is enough playback data to generate live stream playback at the end of the live stream. Live stream generated in this manner may be substantially seamlessly joined after the live stream ends, thereby improving user experience.

In some embodiments, if live stream is on, the electronic device 110 may automatically perform the process 200 to generate playback data. Additionally or in addition, in some embodiments, the electronic device 110 may determine whether or not to turn on the auto-rack function. Whether or not the auto-rack function is turned on may be set by a user. If the electronic device 110 determines that the auto-rack function is turned on, the electronic device 110 performs the process 200. Vice versa, if, for example, the auto-rack function is not turned on, the electronic device 110 may not perform the process 200.

In some embodiments, embodiments of the present disclosure may also be applied to perform only a single transmuxing or transcoding process during a live stream to enable, for example, playback data corresponding to live content during a specified time segment to be generated accordingly.

In some embodiments, after the live stream ends, the electronic device 110 may generate a playback video based on the playback data. The process of generation of the playback video will be described next in connection with FIGS. 3 and 4.

Example Process of Playback Video Generation

Figure 3:
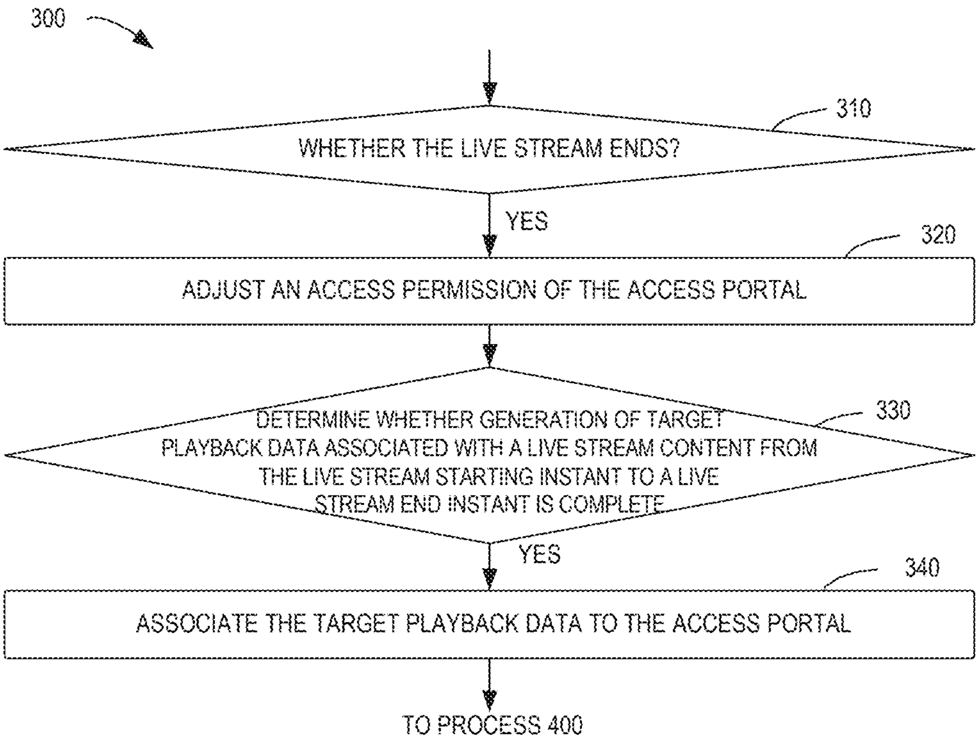
FIG. 3 illustrates a flowchart of a process for associating playback data to an access entry after an end of a live stream according to some embodiments of the present disclosure.

FIG. 3 illustrates a flowchart of a process for associating playback data to an access entry after an end of a live stream according to some embodiments of the present disclosure. Process 300 may be implemented at the electronic device 110. The process 300 is described below with reference to FIG. 1.

At block 310, the electronic device 110 may determine whether the live stream ends. If the electronic device 110 determines, at block 310, that the live stream is not ended, the electronic device 110 may proceed with the process of playback data generation of the process 200 until the live stream ends or until the user indicates that playback generation is no longer performed.

In some embodiments, if the electronic device 110 determines, at block 310, that the live stream ends, the electronic device 110 adjusts an access permission of the access entry at block 320. For example, the electronic device 110 may cause the access entry to go live on a video platform to cause the access entry to adjust from internally accessible to publicly accessible. Accordingly, at this point, the access entry is associated with the most recent playback data that is completed for generation.

Alternatively, the electronic device 110 may also make the access entry live at an appropriate time during the live stream to be accessible to the public. As a result, the public may also be able to obtain access to the playback data that is completed generated in a timely manner during the live stream.

In some embodiments, at block 330, the electronic device 110 determines whether generation of target playback data associated with a live stream content from the live stream starting instant to a live stream end instant is complete. If, at block 330, the electronic device 110 determines that the generation of target playback data is not completed, the electronic device 110 continues with the target process of playback data generation until the target playback data generation is complete.

When the electronic device 110 determines, at block 330, that the generation of target playback data is completed, the electronic device 110 may associate the target playback data to the access entry at block 340. In this way, the playback data generated at a last target instant may be replaced with target playback data corresponding to the live stream content of the entire live process. In this way, it may be further ensured that the subsequently generated playback video has no content loss.

In some embodiments, where the target playback data is associated to the access entry, the electronic device 110 may perform process 400 to generate a playback video based on the target playback data. In this way, a final generated target playback data may be used to perform full gear transcoding after the live stream ends, and then the final generated target playback data is successfully replaced as a final video.

Figure 4:
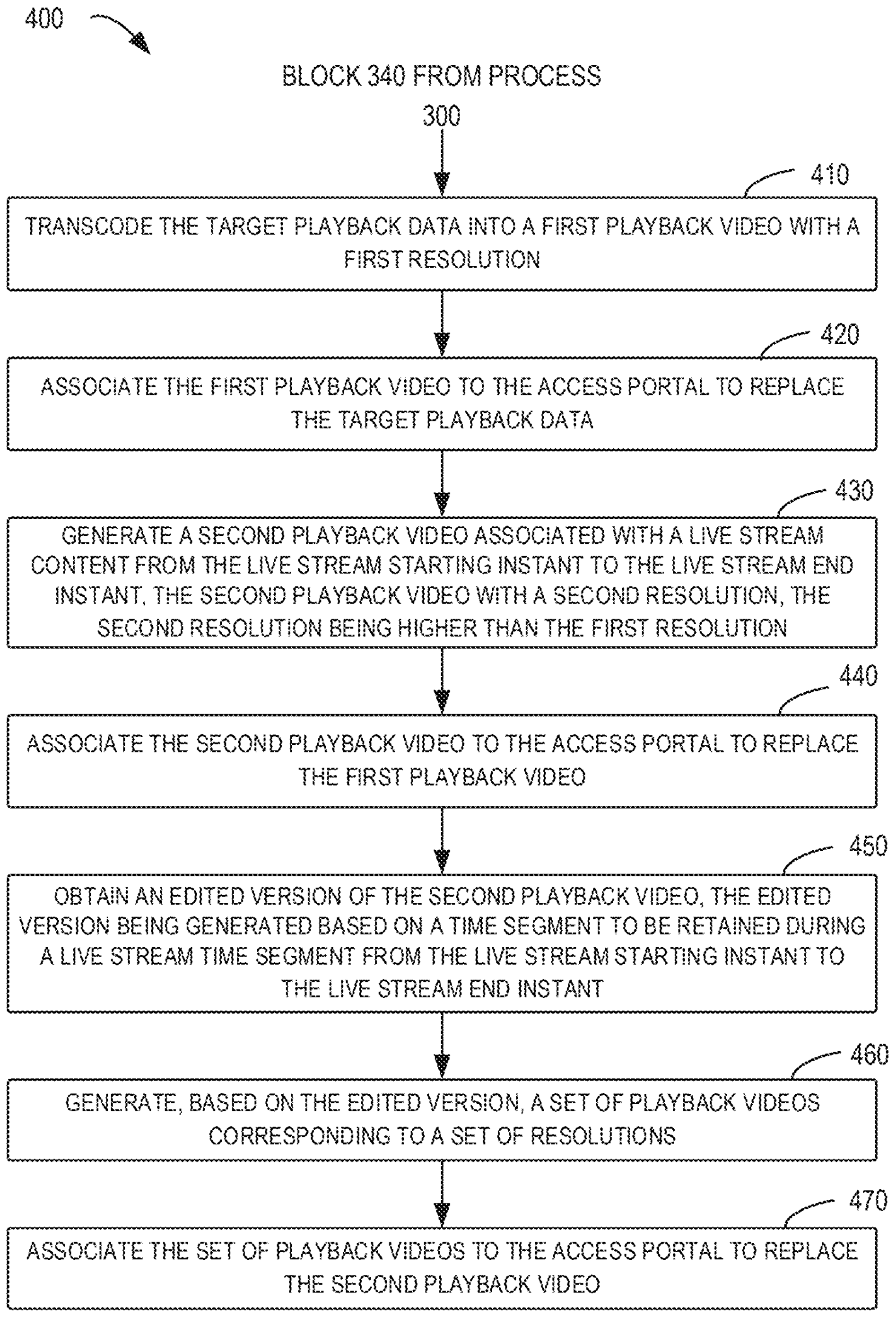
FIG. 4 illustrates a flowchart of a process for playback video generation based on playback data according to some embodiments of the present disclosure.

FIG. 4 illustrates a flowchart of a process for playback video generation based on playback data, according to some embodiments of the present disclosure. Process 400 may be implemented at the electronic device 110. The process 400 is described below with reference to FIG. 1.

At block 410, the electronic device 110 may transcode the target playback data into a first playback video with a first resolution. As an example, the target playback data may be a dash transmuxing data stream with a first resolution (e.g., 1080P). The electronic device 110 may transcode the target playback data into a first playback video in MP4 or other video format with a first resolution (e.g., 1080P).

At block 420, the electronic device 110 may associate the first playback video to the access entry to replace the target playback data. In some embodiments, at block 430, the electronic device 110 generates a second playback video associated with a live stream content from the live stream starting instant to the live stream end instant, the second playback video with a second resolution, the second resolution being higher than the first resolution. For example, the second resolution may be a 4K resolution. The electronic device 110 may employ a currently known or future developed video conversion method to generate the second playback video. The scope of the present disclosure is not limited in this regard.

At block 440, the electronic device 110 may associate the second playback video to the access entry to replace the first playback video. In this way, a clearer playback video may be provided to the user.

In some embodiments, at block 450, the electronic device 110 may obtain an edited version of the second playback video, the edited version being generated based on a time segment to be retained during a live stream time segment from the live stream starting instant to the live stream end instant. In this way, the content may be cropped at any time in the process of the live stream to remove a unwanted live stream content from the playback video.

In some embodiments, at block 460, the electronic device 110 generates, based on the edited version, a set of playback videos corresponding to a set of resolutions. For example, the electronic device 110 may generate a set of playback videos with different resolutions. As a further example, the electronic device 110 may generate a plurality of playback videos based on the clips. Each playback video may include a highlight of the live stream or a content that is of high interest to the user. At block 470, the electronic device 110 may associate the set of playback videos to the access entry to replace the second playback video.

In this way, playback videos with different resolutions may be provided to the user. The user may select the video resolution to be viewed based on actual needs, thereby improving user experience. On the other hand, by generating a plurality of playback videos including different contents, the user may be enabled to selectively view the live stream content segments of interest. The playback videos with different resolutions and different contents may meet the requirements of different users and improve the user experience.

Example Apparatus and Apparatus

Figure 5:
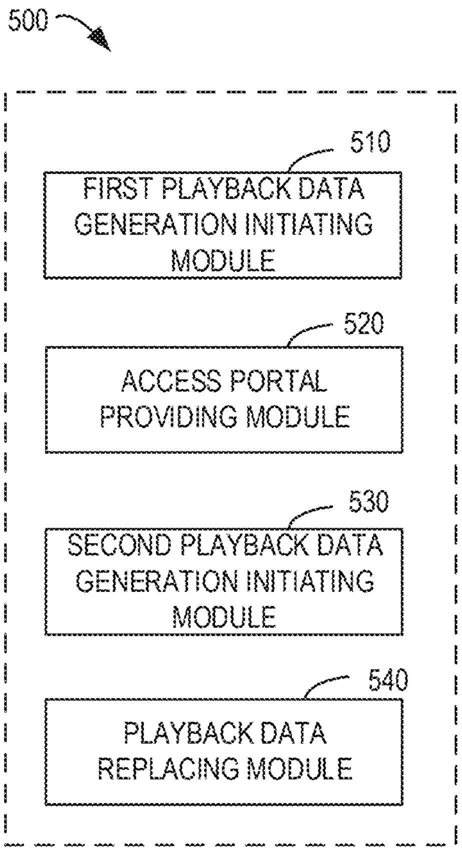
FIG. 5 illustrates a block diagram of an apparatus for live stream playback generation according to some embodiments of the present disclosure.

FIG. 5 illustrates a schematic structural block diagram of an apparatus 500 for live stream playback generation according to some embodiments of the present disclosure. The apparatus 500 may be implemented or included in the electronic device 110. The various modules/components in the apparatus 500 may be implemented by hardware, software, firmware, or any combination thereof.

As shown, the apparatus 500 includes a first playback data generation initiating module 510 configured to initiate, at a first instant during a live stream, generation of first playback data associated with a live stream content from a live stream starting instant to the first instant. The apparatus 500 further includes an access entry providing module 520 configured to, in response to a completion of the generation of the first playback data, provide an access entry for the first playback data. The apparatus 500 further includes a second playback data generation initiating module 530 configured to initiate, at a second instant during the live stream, generation of second playback data associated with a live stream content from the live stream starting instant to the second instant. The apparatus 500 further includes a playback data replacing module 540 configured to, in response to a completion of the generation of the second playback data, associate the second playback data to the access entry to replace the first playback data.

In some embodiments, the first instant is separated from the second instant by a predetermined duration.

In some embodiments, the apparatus 500 further includes a time constraint information determining module configured to determine time constraint information indicating at least one time segment that needs to be processed during a first time segment from the live stream starting instant to the first instant. In some embodiments, the apparatus 500 further includes a first playback data generating module configured to generate the first playback data corresponding to the at least one time segment.

In some embodiments, the generation of the second playback data is further based at least in part on the time constraint information.

In some embodiments, the apparatus 500 further includes a third playback data generating module configured to generate third playback data associated with a live stream content from the first instant to the second instant. In some embodiments, the apparatus 500 further includes a second playback data generating module configured to generate the second playback data based on the first playback data and the third playback data.

In some embodiments, the first playback data and/or the second playback data are generated based on transmuxing at least a part of respective live stream content.

In some embodiments, the apparatus 500 further includes a permission managing module configured to, in response to an end of a live stream, adjust an access permission of the access entry.

Additionally or in addition, in some embodiments, the apparatus 500 further includes a playback data associating module configured to, in response to a completion of generation of target playback data associated with a live stream content from the live stream starting instant to a live stream end instant, associate the target playback data to the access entry.

In some embodiments, the apparatus 500 further includes a first playback video generating module configured to transcode the target playback data into a first playback video with a first resolution. The apparatus 500 may further include a first playback video associating module configured to associate the first playback video to the access entry to replace the target playback data.

In some embodiments, the apparatus 500 further includes a second playback video generating module configured to generate a second playback video associated with a live stream content from the live stream starting instant to the live stream end instant, the second playback video with a second resolution, the second resolution being higher than the first resolution. In some embodiments, the apparatus 500 further includes a second playback video associating module configured to associate the second playback video to the access entry to replace the first playback video.

In some embodiments, the apparatus 500 further includes an edited version obtaining module configured to obtain an edited version of the second playback video, the edited version being generated based on a time segment to be retained during a live stream time segment from the live stream starting instant to the live stream end instant.

In some embodiments, the apparatus 500 further includes a third playback video generating module configured to generate, based on the edited version, a set of playback videos corresponding to a set of resolutions. Additionally, in some embodiments, the apparatus 500 further includes a third playback video associating module configured to associate the set of playback videos to the access entry to replace the second playback video.

Figure 6:
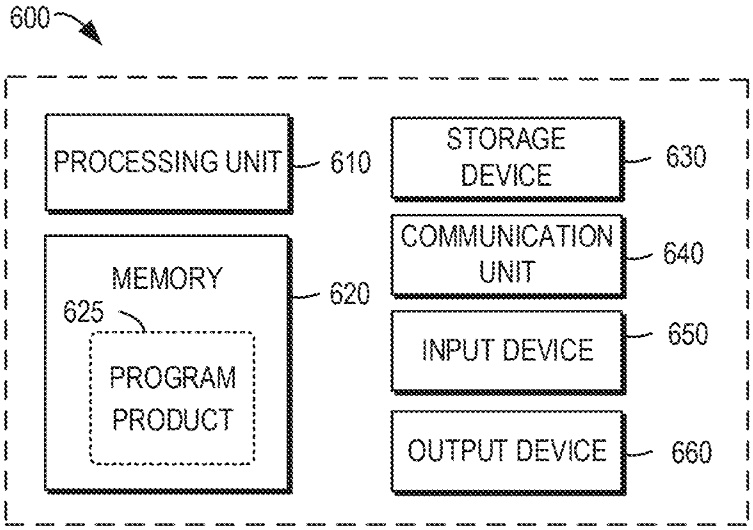
FIG. 6 illustrates a block diagram of a device capable of implementing various embodiments of the present disclosure.

FIG. 6 illustrates a block diagram of an electronic device 600 in which one or more embodiments of the present disclosure may be implemented. It should be understood that the electronic device 600 illustrated in FIG. 6 is merely for example and should not constitute any limitation on the functionality and scope of the embodiments described herein. The electronic device 600 shown in FIG. 6 may be configured to implement the terminal device 110 in FIG. 1.

As shown in FIG. 6, the electronic device 600 is in a form of a general-purpose electronic device. Components of the electronic device 600 may include, but are not limited to, one or more processors or processing units 610, memory 620, storage device 630, one or more communication units 640, one or more input devices 650, and one or more output devices 660. The processing units 610 may be actual or virtual processors and are capable of performing various processes based on programs stored in the memory 620. In a multiprocessor system, a plurality of processing units perform computer-executable instructions in parallel to increase the parallel processing power of the electronic device 600.

The electronic device 600 typically includes a plurality of computer storage media. Such media may be any obtainable media accessible to the electronic device 600, including, but not limited to, volatile and non-volatile media, removable and non-removable media. The memory 620 may be volatile memory (e.g., registers, cache, random access memory (RAM)), non-volatile memory (e.g., read-only memory (ROM), electrically erasable programmable read-only memory (EEPROM), flash memory), or some combination thereof. The storage device 630 may be a removable or non-removable medium and may include a machine-readable medium, such as a flash drive, a disk, or any other medium that may be capable of being used to store information and/or data (e.g., training data for training) and may be accessible within the electronic device 600.

The electronic device 600 may further include additional removable/non-removable, volatile/non-volatile storage media. Although not shown in FIG. 6, a disk drive for reading from or writing to a removable, non-volatile disk (e.g., a 'floppy disk') and an optical disk drive for reading from or writing to a removable, non-volatile optical disk may be provided. In these embodiments, each drive may be connected to a bus (not shown) by one or more data media interfaces. The memory 620 may include a computer program product 625 having one or more program modules that are configured to perform various methods or actions of various embodiments of the present disclosure.

The communication unit 640 implements communication with other electronic devices via a communication medium. Additionally, the functions of the components of the electronic device 600 may be implemented as a single computing cluster or a plurality of computing machines that are capable of communicating over a communication connection. Thus, the electronic device 600 may use logical connections to one or more other servers, networked personal computers (PCs), or another network node to operate in a networked environment.

The input device 650 may be one or more input devices, such as a mouse, a keyboard, a tracking ball, and the like. The output device 660 may be one or more output devices, such as a monitor, a speaker, a printer, and the like. The electronic device 600 may also communicate, as desired, via the communication unit 640, with one or more external devices (not shown), external devices such as storage devices, display devices, etc., with one or more devices that enable a user to interact with the electronic device 600, or with any device that enables the electronic device 600 to communicate with one or more other electronic devices (e.g., a network card, modem, etc.) to communicate. Such communication may be performed via an input/output (I/O) interface (not shown).

According to example implementations of the present disclosure, a computer-readable storage medium having a computer program stored thereon is provided, the program, when performed by a processor, implementing the method described above. According to example implementations of the present disclosure, a computer program product is also provided, the computer program product being tangibly stored on a non-transitory computer-readable medium and including computer-executable instructions, and the computer-executable instructions being performed by a processor to implement the methods described above.

Aspects of the present disclosure are described herein with reference to flowcharts and/or block diagrams of methods, apparatuses, devices, and computer program products implemented in accordance with the present disclosure. It should be understood that each block of the flowchart and/or block diagram, and combinations of blocks in the flowcharts and/or block diagrams, may be implemented by computer readable program instructions.

These computer-readable program instructions may be provided to a processing unit of a general purpose computer, special purpose computer, or other programmable data processing apparatus to produce a machine, such that the instructions, when executed by a processing unit of a computer or other programmable data processing apparatus, produce means to implement the functions/acts specified in the flowchart and/or block diagram. These computer-readable program instructions may also be stored in a computer-readable storage medium that cause the computer, programmable data processing apparatus, and/or other devices to function in a particular manner, such that the computer-readable medium storing instructions includes an article of manufacture including instructions to implement aspects of the functions/acts specified in the flowchart and/or block diagram(s).

The computer-readable program instructions may be loaded onto a computer, other programmable data processing apparatus, or other apparatus, such that a series of operational steps are performed on a computer, other programmable data processing apparatus, or other apparatus to produce a computer-implemented process such that the instructions executed on a computer, other programmable data processing apparatus, or other apparatus implement the functions/acts specified in the flowchart and/or block diagram block or blocks.

The flowchart and block diagrams in the figures show architecture, functionality, and operation of possible implementations of systems, methods, and computer program products according to various implementations of the present disclosure. In this regard, each block in the flowchart or block diagram may represent a module, program segment, or portion of an instruction that includes one or more executable instructions for implementing the specified logical function. In some alternative implementations, the functions noted in the blocks may also occur in a different order than noted in the figures. For example, two consecutive blocks may actually be performed substantially in parallel, which may sometimes be performed in the reverse order, depending on the functionality involved. It is also noted that each block in the block diagrams and/or flowchart, as well as combinations of blocks in the block diagrams and/or flowchart, may be implemented with a dedicated hardware-based system that performs the specified functions or actions, or may be implemented in a combination of dedicated hardware and computer instructions.

Various implementations of the present disclosure have been described above, which are exemplary, not exhaustive, and are not limited to the implementations disclosed. Many modifications and variations will be apparent to those of ordinary skill in the art without departing from the scope and spirit of the various implementations illustrated. The selection of the terms used herein is intended to best explain the principles of the implementations, practical applications, or improvements to techniques in the marketplace, or to enable others of ordinary skill in the art to understand the various implementations disclosed herein.

What is claimed is:

1. A method for live stream playback generation, comprising:

initiating, at a first instant during a live stream, generation of first playback data associated with a live stream content from a live stream starting instant to the first instant;

in response to a completion of the generation of the first playback data, providing an access entry for the first playback data;

initiating, at a second instant during the live stream, generation of second playback data associated with a live stream content from the live stream starting instant to the second instant;

in response to a completion of the generation of the second playback data, associating the second playback data to the access entry to replace the first playback data; and in response to an end of the live stream, adjusting an access permission of the access entry.

2. The method of claim 1, wherein the first instant is separated from the second instant by a predetermined duration.

3. The method of claim 1, further comprising:

determining time constraint information indicating at least one time segment that needs to be processed during a first time segment from the live stream starting instant to the first instant; and generating the first playback data corresponding to the at least one time segment.

4. The method of claim 3, wherein the generation of the second playback data is further based at least in part on the time constraint information.

5. The method of claim 1, further comprising:

generating third playback data associated with a live stream content from the first instant to the second instant; and generating the second playback data based on the first playback data and the third playback data.

6. The method of claim 1, wherein the first playback data and/or the second playback data are generated based on transmuxing at least a part of respective live stream content.

7. The method of claim 1, further comprising:

in response to a completion of generation of target playback data associated with a live stream content from the live stream starting instant to a live stream end instant, associating the target playback data to the access entry.

8. The method of claim 7, further comprising:

transcoding the target playback data into a first playback video with a first resolution; and associating the first playback video to the access entry to replace the target playback data.

9. The method of claim 8, further comprising:

generating a second playback video associated with a live stream content from the live stream starting instant to the live stream end instant, the second playback video with a second resolution, the second resolution being higher than the first resolution; and associating the second playback video to the access entry to replace the first playback video.

10. The method of claim 9, further comprising:

obtaining an edited version of the second playback video, the edited version being generated based on a time segment to be retained during a live stream time segment from the live stream starting instant to the live stream end instant;

generating, based on the edited version, a set of playback videos corresponding to a set of resolutions; and associating the set of playback videos to the access entry to replace the second playback video.

11. An electronic device, comprising:

at least one processing unit; and at least one memory coupled to the at least one processing unit and storing instructions for execution by the at least one processing unit, the instructions, when performed by the at least one processing unit, causing the electronic device to perform acts comprising:

initiating, at a first instant during a live stream, generation of first playback data associated with a live stream content from a live stream starting instant to the first instant;

in response to a completion of the generation of the first playback data, providing an access entry for the first playback data;

initiating, at a second instant during the live stream, generation of second playback data associated with a live stream content from the live stream starting instant to the second instant;

in response to a completion of the generation of the second playback data, associating the second playback data to the access entry to replace the first playback data; and in response to an end of the live stream, adjusting an access permission of the access entry.

12. The electronic device of claim 11, wherein the first instant is separated from the second instant by a predetermined duration.

13. The electronic device of claim 11, wherein the acts further comprise:

determining time constraint information indicating at least one time segment that needs to be processed during a first time segment from the live stream starting instant to the first instant; and generating the first playback data corresponding to the at least one time segment.

14. The electronic device of claim 13, wherein the generation of the second playback data is further based at least in part on the time constraint information.

15. The electronic device of claim 11, wherein the acts further comprise:

generating third playback data associated with a live stream content from the first instant to the second instant; and generating the second playback data based on the first playback data and the third playback data.

16. The electronic device of claim 11, wherein the first playback data and/or the second playback data are generated based on transmuxing at least a part of respective live stream content.

17. The electronic device of claim 11, wherein the acts further comprise:

in response to a completion of generation of target playback data associated with a live stream content from the live stream starting instant to a live stream end instant, associating the target playback data to the access entry.

18. A non-transitory computer-readable storage medium having a computer program stored thereon, the computer program being executable by a processor to implement acts comprising:

initiating, at a first instant during a live stream, generation of first playback data associated with a live stream content from a live stream starting instant to the first instant;

in response to a completion of the generation of the first playback data, providing an access entry for the first playback data;

initiating, at a second instant during the live stream, generation of second playback data associated with a live stream content from the live stream starting instant to the second instant;

in response to a completion of the generation of the second playback data, associating the second playback data to the access entry to replace the first playback data; and in response to an end of the live stream, adjusting an access permission of the access entry.

* * * * *